(12) United States Patent
Nene

(10) Patent No.: US 8,686,767 B1
(45) Date of Patent: Apr. 1, 2014

(54) APPARATUS AND METHOD FOR A PROGRAMMABLE TIMING IN PEAK CURRENT MODE CONTROLLED POWER CONVERTERS

(71) Applicant: Texas Instruments Incorporated, Dallas, TX (US)

(72) Inventor: Hrishikesh Ratnakar Nene, Katy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/775,154

(22) Filed: Feb. 23, 2013

(51) Int. Cl.
*G06F 1/24* (2006.01)

(52) U.S. Cl.
USPC ............................................. 327/142

(58) Field of Classification Search
CPC ......... H03K 17/223; H03K 17/22; G06F 1/24
USPC ........................................................ 327/142
See application file for complete search history.

(56) References Cited

U.S. PATENT DOCUMENTS

| | | | | |
|---|---|---|---|---|
| 4,673,859 A | * | 6/1987 | Shero et al. | 318/810 |
| 8,155,164 B2 | * | 4/2012 | Yasuda et al. | 375/130 |
| 8,169,206 B2 | * | 5/2012 | Chang et al. | 323/284 |
| 2011/0280299 A1 | * | 11/2011 | O'Malley et al. | 375/238 |
| 2013/0063101 A1 | * | 3/2013 | Nene | 323/234 |
| 2013/0063414 A1 | * | 3/2013 | Huang et al. | 345/213 |
| 2013/0132758 A1 | * | 5/2013 | Shiba | 713/340 |

* cited by examiner

*Primary Examiner* — Adam Houston
(74) *Attorney, Agent, or Firm* — John R. Pessetto; W. James Brady; Frederick J. Telecky, Jr.

(57) ABSTRACT

An apparatus and a method for a programmable timing in digital integrated circuits implementing peak current mode controlled power converters are disclosed. The programmable dead-time is implemented by means implemented in hardware, software, and combination of hardware and software, carrying out setting a second timer value; setting a third timer value with respect to the second timer value; detecting a reset event; reloading a second counter from a current timer value to the second timer value upon detecting the reset event; resetting a second pulse width modulated waveform amplitude from a second amplitude value to a first amplitude value upon detecting the reset event; and setting a first pulse width modulated waveform from a first amplitude value to a second value upon the second counter reaching a third value.

10 Claims, 5 Drawing Sheets

APPARATUS AND METHOD FOR A PROGRAMMABLE TIMING IN PEAK CURRENT MODE CONTROLLED POWER CONVERTERS

FIELD

The present disclosure relates to digital integrated circuits, and, more particularly, to an apparatus and a method for a programmable timing in digital integrated circuits implementing peak current mode controlled power converters.

BACKGROUND

A peak current mode control (PCMC) is a control scheme for power converters enabling, in theory, certain desirable advantages like voltage feed forward, automatic cycle by cycle current limiting and other advantages known to persons skilled in the art. To implement this PCMC control scheme in practice, precisely controlled pulse width modulated (PWM) waveforms to drive control switches in power converters are essential. These power converters often employ a peak current reference without or with a slope compensation. The peak current reference is compared with a current sensed at the output of the power converter; the result of the comparison controlling the PWM waveform.

FIG. 1 depicts a conceptual block diagram of a digitally controlled PCMC based power converter system 100. A power converter 102 receives at its input an input voltage $V_{in}$ from a source 104 and provides at its output a regulated voltage $V_{out}$ to a load 106. To accomplish the $V_{out}$ regulation, the $V_{out}$ feedback is provided to block 108 comprising an analog-to-digital (ADC) converter, which digitizes the $V_{out}$ feedback, which is then provided to a first input of a block 110 comprising a comparator and a voltage controller (not shown). A digital reference voltage $V_{ref}$ from a reference voltage source 112 is provided to a second input of the block 110. The digitized $V_{out\_d}$ feedback and the digital reference voltage $V_{ref}$ are compared by the comparator and the result of the comparison is provided to the voltage controller. Based on the comparison, the voltage controller generates voltage $V_{comp}$, which is provided at the output of the voltage controller 110 and serves to derive a peak current reference signal $I_{pref}$.

It is well known by persons of ordinary skills in the art that PCMC based power converter systems suffer from stability issues and sub-harmonic oscillations for operation above 50% duty cycle theoretically. A duty cycle is the time that the PWM waveform spends in an active state. Consequently, the PCMC based power converter systems may implement a slope compensation. The slope compensation can be applied to the peak current $I_{peak}$, decrementing the peak current $I_{peak}$ by a ramp thus arrive at a slope compensated peak current reference signal $I_{pref}$. Alternatively, the slope compensation may be achieved by keeping the peak current $I_{peak}$ constant and increment a feedback current $I_{fb}$ by the ramp.

As depicted in FIG. 1, the feedback current $I_{fb}$ is sensed at a node of converter 102 dependent on a topology of power converter, means of controlling the converter, and other design criteria known to persons skilled in the art. By means of example, the feedback current may be a current through the load 106; it could be a current through an inductor, transformer primary current, and other nodes known to persons skilled in the art.

For clarity of explanation of the different aspects the slope compensated peak current reference signal $I_{pref}$ is used; however, the disclosed concepts are equally applicable to the case where the slope compensation ramp is added to the feedback current $I_{fb}I_{fb}$.

The generation of a slope compensated peak current reference signal $I_{pref}$ is carried out by a block 114, comprising a digital-to-analog (DAC) converter, for converting the digital representation of the voltage $V_{out}$ provided by the voltage controller 114 to an analog representation corresponding to a peak current $I_{peak}$, and a ramp generator which generates a slope for compensation taking the value of the peak current $I_{peak}$ as initial value for the ramp generator.

The slope compensated peak current reference signal $I_{pref}$ is provided to a first input of a block 116. The second input of the block 116 is provided with a feedback current $I_{fb}$ corresponding to a sensed current in the power converter 102. The block 116 comprises a comparator (not shown), which compares the slope compensated peak current reference signal $I_{pref}$ with the feedback current $I_{fb}$, and the result of the comparison affects various attributes of the PWM waveforms PWM(1)-PWM(n) generated by a PWM generator (not shown) of the block 116 and provided to the power converter 102.

Although as described above, blocks 108, 110, 114, 116, and 112 comprise a digital PCMC controller 101, persons skilled in the art would understand that not all the blocks need to be implemented in the digital PCMC controller 101. By means of an example, the slope compensation, i.e., the block 114 may or may not be implemented in the digital PCMC controller 101. Likewise, the comparator, described as a part of block 116, may be external to the digital PCMC controller 101. The digital PCMC controller 101 may optionally be interfaced with or reside inside a digital controller 117, e.g., a Microcontroller, Digital Signal Processor, and any other digital controller known to persons of ordinary skills in the art. The digital controller 117 may be utilized to program various attributes of the PWM waveforms and the slope for compensation; therefore, imparting more intelligence to the system and an ability to adaptively adjust to changing conditions for optimum digitally controlled PCMC based power converter system 100 performance.

The different implementation of the digital PCMC controller 101 may provide a different number of the PWM waveforms in accordance with a proposed use of a particular digital PCMC controller 101. However, it is understood by persons of ordinary skills in the art that not all the waveforms need to be generated and provided to the power converter. Thus, by means of an example a buck power converter may require a single PWM waveform, a synchronous buck power converter may require two PWM waveforms, an isolated phase shifted full bridge direct-current-to-direct-current (DC-DC) converter with synchronous rectification may require six waveforms, and the like.

As noted above, to achieve the above-mentioned theoretical advantages of the PCMC control scheme, generating precisely controlled timing of PWM waveforms to drive control switches in the power converters is essential. By means of an example, some power converters require that turning on and turning off two or more switches must be accurately adjusted. An example of such a power converter is the isolated phase shifted full bridge direct-current-to-direct-current (DC-DC) converter with synchronous rectification, where the synchronous rectifier switches need to be turned ON/OFF at precise, in some cases programmable, times relative to the time the feedback current reaches the peak current reference and relative to the PWM time period of the full bridge switches. By means of another example, some power converters require that two or more switches must be prevented to be turned on at the same time to prevent a current to simultaneously flow through the two or more switches, a fault known as "shoot-through." An example of such a power converter 102 comprises a synchronous buck power converter. Because the two examples describe the same problem, generating precisely controlled PWM waveforms, which is accomplished by the same means, for the purposes of clarity of explanation of such a precise control, the synchronous buck power converter is used as an example without any loss of generality.

One technique for avoiding shoot-through provides timing between the turn-off of the first switch to the turn-on of the second switch and vice versa and is explained in reference to FIG. 2, which depicts a conceptual schematics of a synchronous buck power converter along with waveforms of interest 200. Although the term timing expresses the idea of generating precisely controlled timing of PWM waveforms to drive control switches in the power converters, because in relation to the shoot-through, the timing, i.e., the difference between the turn-off of the first switch to the turn-on of the second switch is called dead-time, the term is used in the example.

Referring to FIG. 2A, a power supply 204 provides an input voltage $V_{in}$ to the synchronous buck power converter 202. As well known in the art, the circuitry of a synchronous buck converter comprises an (optional) input capacitor 202_1 to smooth a potential variation of the input voltage $V_{in}$, a pair of switches 202_2 and 202_3 that enable charge and discharge the inductor 202_4/capacitor 202_5 combination; thus regulating the output voltage $V_{out}$, which is provided to the load 206.

The switches 202_2 and 202_3 are driven by two PWM waveforms generated by a PWM waveform generator, e.g., the PWM waveform generator 116 of FIG. 1 (not shown in FIG. 2A). Such a PWM waveform generator must generate the two PWM waveforms such that the switches 202_2 and 202_3 are prevented to be turned on at the same time.

FIG. 2B depicts an amplitude as a function of time of selected waveforms facilitating understanding of the timing technique.

Referring to FIG. 2B, at time $t_0$, which marks an end of a previous PWM period and a start of a new PWM period, the slope compensated peak current reference signal $I_{pref}$ 224, is reset to a peak current value $I_{peak}$ and a ramp is decremented from the a peak current value $I_{peak}$ for the slope compensation. At the same time, the first PWM waveform 218 is reset from an amplitude $A_{1\_2}$ to an amplitude $A_{1\_1}$; thus, causing switch 202_3 of FIG. 2A, to open. The feedback current $I_{fb}$ 222 keeps decreasing.

After a first dead-time $DT_1$, i.e., at time $t_1$, the second PWM waveform 220 is set from an amplitude $A_{2\_1}$ to an amplitude $A_{2\_2}$; thus, causing switch 202_2 of FIG. 2A, to close; thus causing the feedback current $I_{fb}$ 222 to start increasing until reaching the limit set by the slope compensated peak current reference signal $I_{pref}$ 224 at time $t_2$, when the second PWM waveform 220 is reset from the amplitude $A_{2\_2}$ to an amplitude $A_{2\_1}$; the reset causing switch 202_2 of FIG. 2A, to open, thus causing the feedback current $I_{fb}$ 222 to start decreasing.

After a second dead-time $DT_2$, i.e., at time $t_3$, the first PWM waveform 218 is set from the amplitude $A_{1\_1}$ to the amplitude $A_{1\_2}$; thus, causing switch 202_3 of FIG. 2A, to close; thus keeping the feedback current $I_{fb}$ 222 decreasing.

At time $t_4$ the PWM period ends, the first PWM waveform 218 is reset from an amplitude $A_{1\_2}$ to an amplitude $A_{1\_1}$, the slope compensated peak current reference signal $I_{pref}$ 224, is reset to a peak current value $I_{peak}$ and the PWM period is repeated.

Based on the foregoing description, the start of dead-time $DT_1$ is initiated by an event generated at the instant the feedback current $I_{fb}$ reaches the peak reference signal $I_{pref}$. This event is based on factors external to the IC for PCMC controller. Although the PCMC controller itself could take an action based on the detection, the timing is generated by an external support circuit. Accordingly, achieving variable delay could be achieved by implementing a plurality of such external support circuit. Such a solution is in practice limited to about five external support circuits, due to power, real-state area, power requirements and other practical considerations.

Consequently, there is a need in the art to provide a solution to at least some of the above-disclosed problems.

SUMMARY

In one aspect of the disclosure, an apparatus and a method for programmable timing in digital integrated circuits implementing peak current mode controlled power converters according to appended independent claims is disclosed. Preferred additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

DETAILED DESCRIPTION

Figure 1:
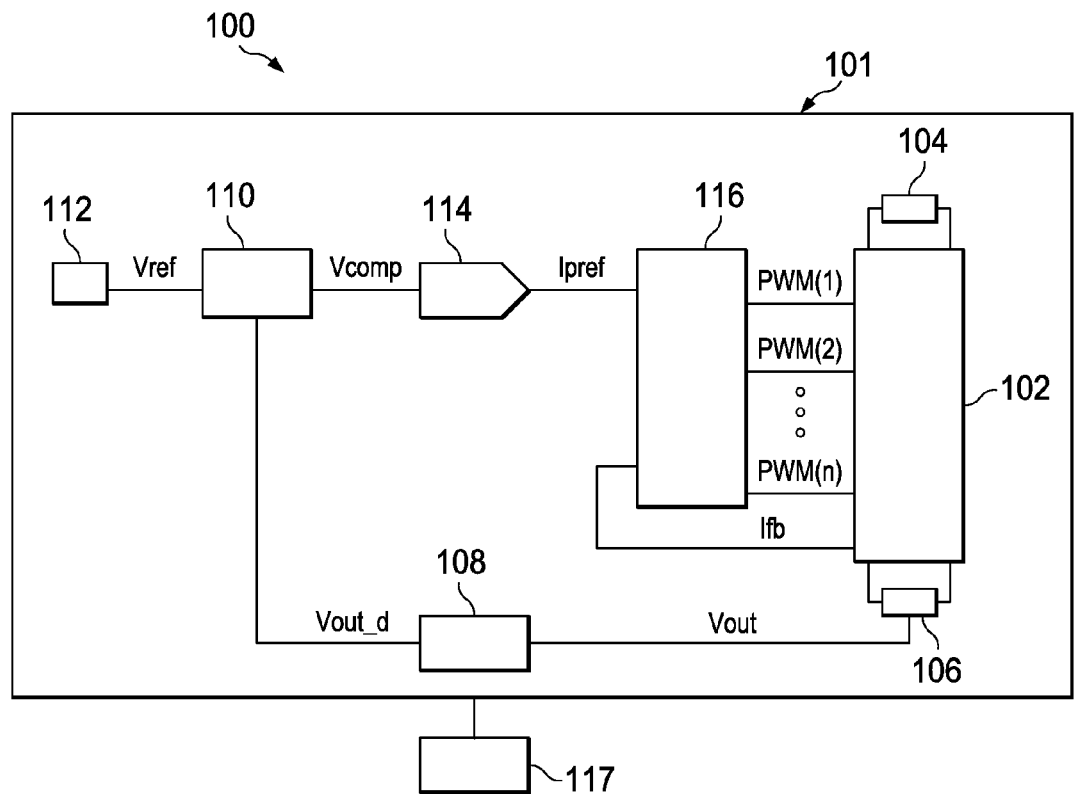
FIG. 1 depicts a conceptual block diagram of a digitally controlled PCMC based power converter system according to known concepts.
Figure 2A:
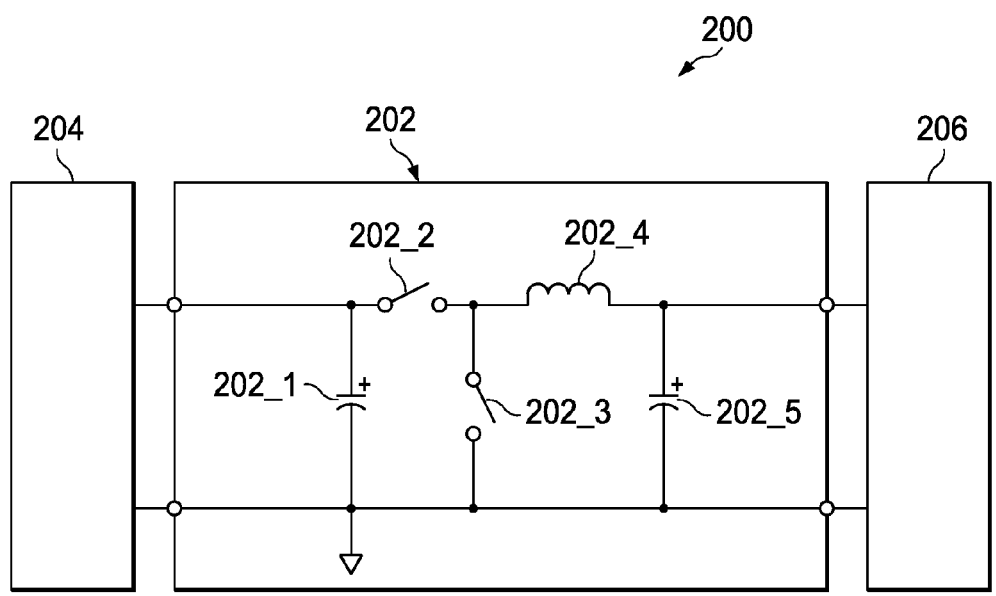
FIG. 2A depicts a conceptual schematics of a synchronous buck power converter according to known concepts.
Figure 2B:
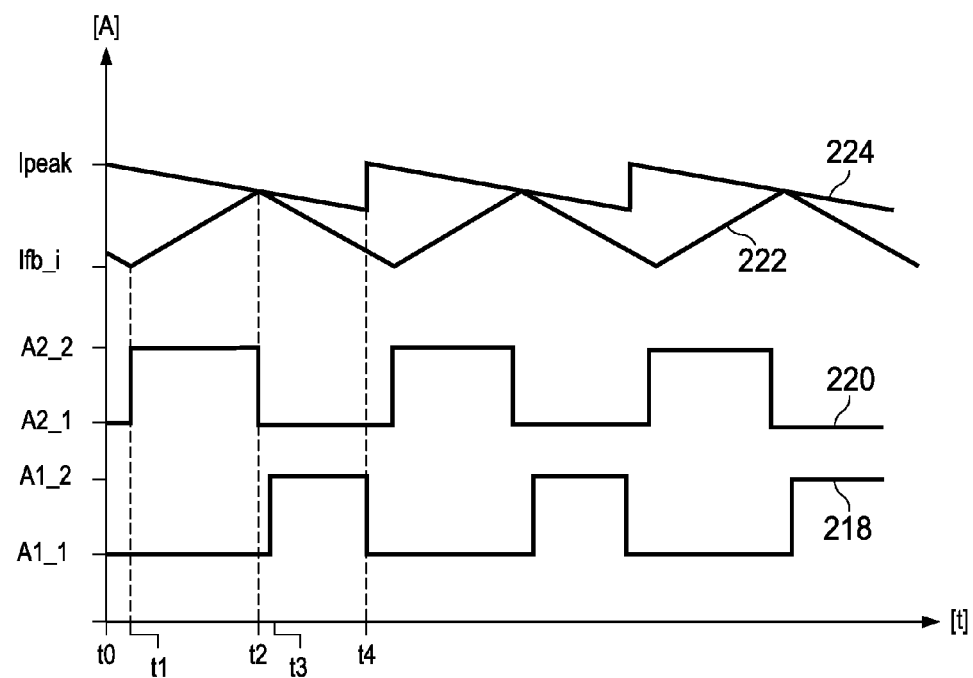
FIG. 2B depicts the synchronous buck power converter's waveforms of interest according to known concepts.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes are not intended to illustrate the precise shape of an element and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Figure 3:
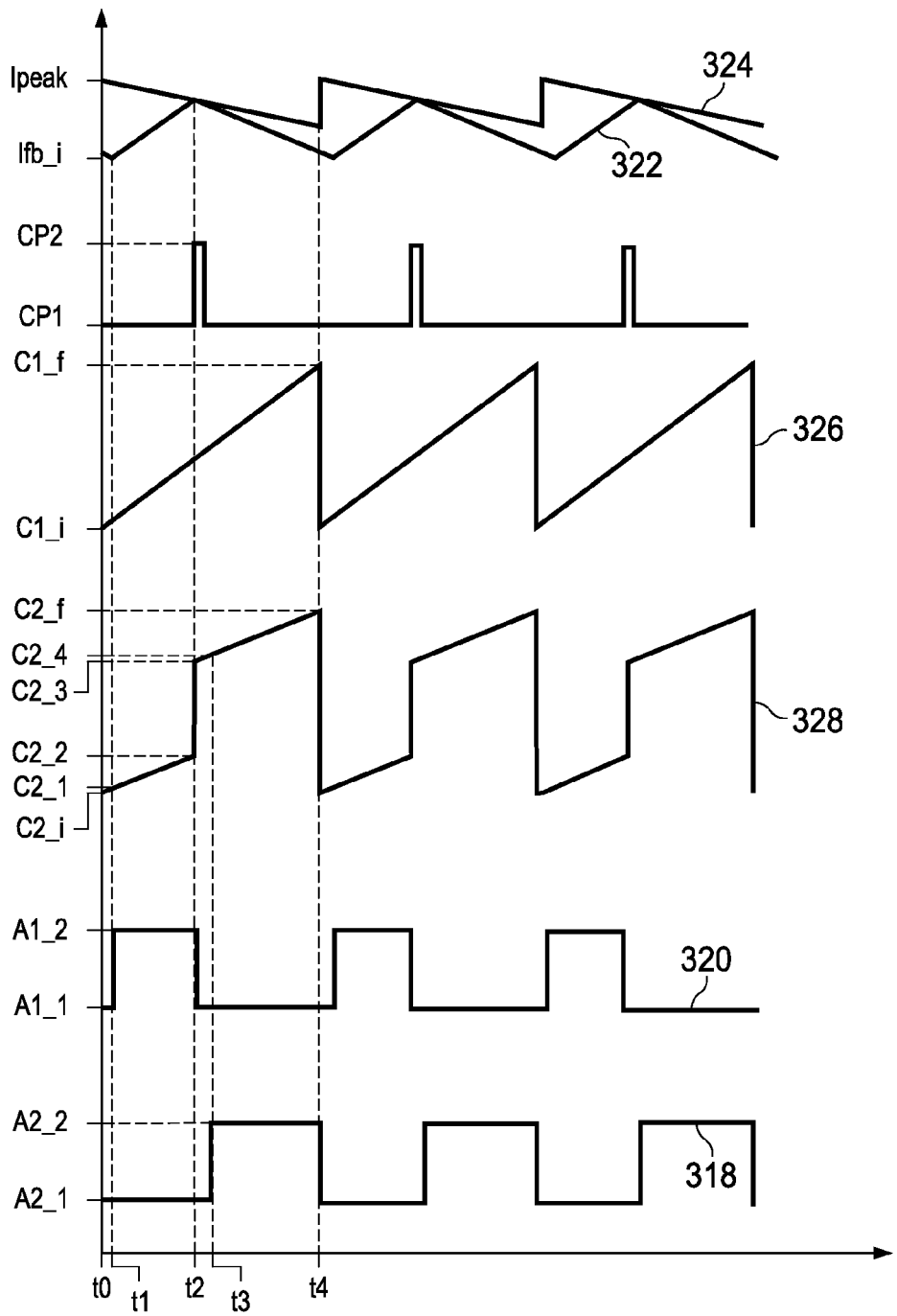
FIG. 3 depicts PWM waveform generation for PCMC controllers using timer counters.

FIG. 3 depicts PWM waveform generation for PCMC controllers using timer counters. For clarity of explanation of the different aspects, an exemplary power converter comprising two switches that must be prevented to be turned on at the same time is assumed without any loss of generality. Such a power converter may comprise, e.g., the synchronous buck converter described supra. However, it is understood that the aspects can be applied to any power converter comprising two or more switches that must be prevented to be turned on at the same time. An example of such a power converter is an isolated phase shifted full bridge DC-DC converter with synchronous rectification.

Reference 326 denotes a representation of a first timer counter counting from an initial value $C_{1\_i}$ to a final value $C_{1\_f}$. Although any value may be used as the initial value $C_{1\_i}$, the initial value $C_{1\_i}$ is usually set to zero. The final value $C_{1\_f}$ comprises a PWM time period value required to achieve a desired PWM frequency, increased by the initial value $C_{1\_i}$. In this aspect, the first timer counter counts up. i.e., from a low initial value $C_{1\_i}$ to a high final value $C_{1\_f}$. However, in another aspect the counter may count down from an initial value $C_{1\_i}$ equal to the PWM time period value, increased by the final value $C_{1\_f}$ usually set to zero.

Similarly, reference 328 denotes a representation of a second timer counter counting from an initial value $C_{2\_i}$ to a final value $C_{2\_f}$. Although any value may be used as the initial value $C_{2\_i}$, the initial value $C_{2\_i}$ is usually set to zero. The final value $C_{2\_f}$ is determined upon the time the first timer counter reaches the final value $C_{1\_f}$ at which time the second timer counter is reloaded with the initial value $C_{2\_i}$. In this aspect, the second timer counter counts up. i.e., from a low value initial value $C_{2\_i}$ to a high final value $C_{2\_f}$. However, in another aspect the counter may count down from an initial value $C_{2\_i}$ greater than the PWM time period value increased by at least the final value $C_{2\_f}$ to the final value $C_{1\_f}$ usually set to zero.

As depicted, the first counter and the second counter are started at time $t_0$, which marks end of a previous PWM time period and a start of a new PWM time period. A slope compensated peak current reference signal $I_{pref}$ 324, starts at a peak current value $I_{peak}$ and a ramp is decremented from the peak current value $I_{peak}$ for the slope compensation. An amplitude of a first PWM waveform 320 is at a first value $A_{1\_1}$ and an amplitude of a second PWM waveform 318 is reset to a first value $A_{2\_1}$. The first PWM waveform 320 and the second PWM waveform 318 are provided to a first switch and a second switch respectively in a power converter (not shown). Because only the second PWM waveform 318 is reset to a first value $A_{2\_1}$ only the second switch changes state. The feedback current $I_{fb}$ 322 keeps decreasing.

At time $t_1$, the second timer counter reaches a first value $C_{2\_1}$ and the amplitude of the first PWM waveform 320 is set from the first value $A_{1\_1}$, to a second value $A_{1\_2}$. Consequently, only the first switch changes state. The difference between the time $t_1$ and the time $t_0$ comprises a first dead-time. The duration of the first dead-time is controlled by setting of the first value $C_{2\_1}$. According to one aspect, the first value $C_{2\_1}$ may be determined based on, e.g., an expected load, the speed with which the switches change states, and other parameters known to a person skilled in the art, and is set as a constant. In an alternative aspect, the first value $C_{2\_1}$ is determined by considering operating conditions affecting performance of the PCMC based power converter system, e.g., input voltage level, temperature, load condition, and other operating conditions known to persons skilled in the art. The load condition characterized by, e.g., the value of the load, current through the load, power delivered to the load, and other characteristics known to a person skilled in the art, may be determined, e.g., based on the sensed current through the load, duty cycle of the first PWM waveform, and/or other parameters known to a person skilled in the art. The first value $C_{2\_1}$ is then set according to the operating conditions. Consequently, the dead-time period is adjustable.

At time $t_2$, the feedback current $I_{fb}$ 322 reaches the limit set by the slope compensated peak current reference signal $I_{pref}$ 324. This event is detected by, e.g. a comparator (not shown), an output of which changes from a value $CP_1$ to a value $CP_2$. This event causes reset of the first PWM waveform 320 from the second value $A_{1\_2}$ to the first value $A_{1\_1}$ for the remainder of the PWM time period. Consequently, only the first switch changes state. The event further causes reloading of the current value $C_{2\_2}$ of the second timer counter 328 with a second value $C_{2\_3}$. The second value $C_{2\_3}$ is determined so that no spurious events occur during the remainder of the PWM time period due to the operation of the second counter 328. A spurious event comprises undesirable change in a state of one of the switches. It is understood that the second value $C_{2\_3}$ is dependent on the specific implementation of a power converter and operating conditions, e.g., input voltage level, temperature, load condition, and other variables affecting the PCMC based power converter system known to persons skilled in the art. The load condition characterized by, e.g., the value of the load, current through the load, power delivered to the load, and other characteristics known to a person skilled in the art, may be determined, e.g., based on the feedback current, duty cycle of the first PWM waveform, and/or other parameters known to a person skilled in the art. By means of an example, for the synchronous buck converter, the second value $C_{2\_3}$ must be greater than the PWM period value. By means of another example, the isolated phase shifted full bridge DC-DC power converter with synchronous rectification the second value $C_{2\_3}$ is equal to the initial value $C_{2\_i}$.

At time $t_3$, the second counter reaches a third value $C_{2\_4}$ and the amplitude of the second PWM waveform 318 is set from the first value $A_{2\_1}$, to a second value $A_{2\_2}$. Consequently, only the second switch changes state. The difference between the time $t_3$ and the time $t_2$ comprises a second dead-time. The duration of the second dead-time is controlled by setting the third value $C_{2\_4}$ in relation to the second value $C_{2\_3}$. The third value $C_{2\_4}$ is determined by considering average or expected operating conditions. In one aspect, the third value $C_{2\_4}$ is set to a constant. In an alternative aspect, the operating conditions are reevaluated and the third value $C_{2\_4}$ is being adjusted in accordance with the determined operating conditions. The third value $C_{2\_4}$ is then set according to the particular condition.

At time $t_4$, the first counter reaches the final value $C_{1\_f}$. This event marks an end of the current PWM period and a start of a new PWM period. The first counter and the second counter are reset to the counters' initial values $C_{1\_i}$ respective $C_{2\_i}$, the slope compensated peak current reference signal $I_{pref}$ 324, is reset to a peak current value $I_{peak}$ and the amplitude of the second PWM waveform 318 is set from the second value $A_{2\_2}$, to the first value $A_{2\_1}$. Consequently, only the second switch changes state.

Figure 4A:
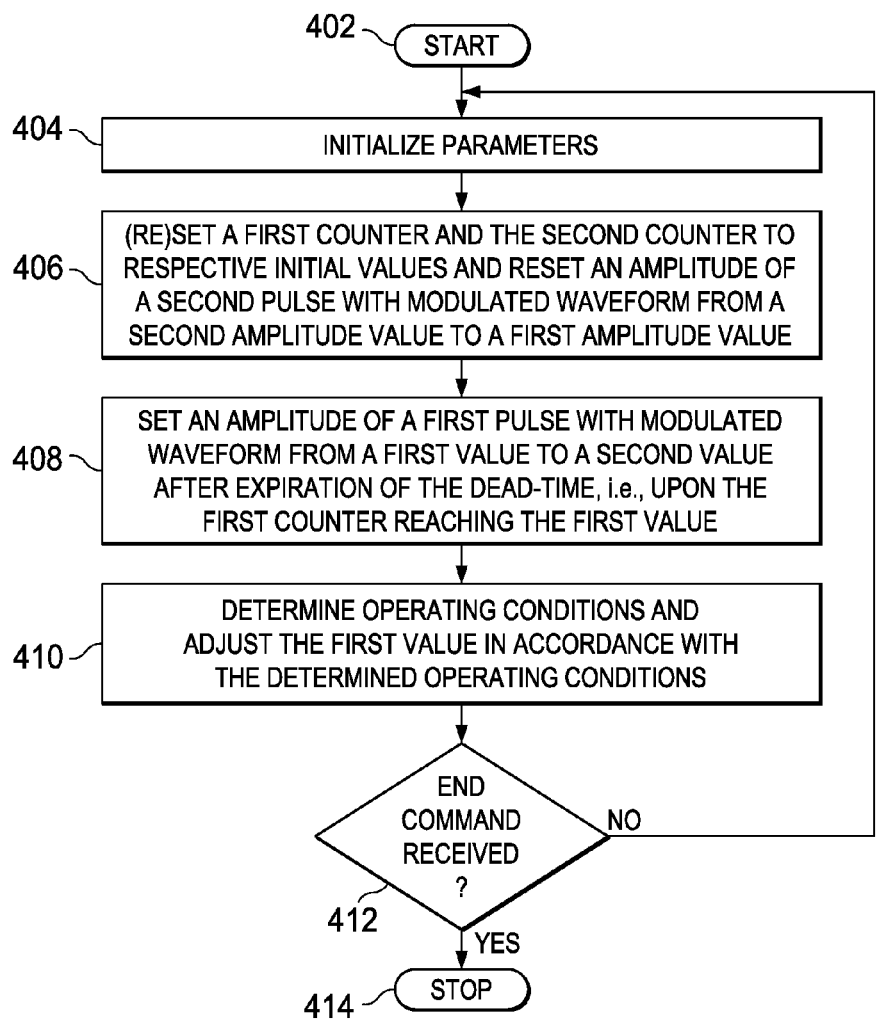
FIG. 4A depicts a flow chart diagram controlling timing at first part of a PWM period using timer counters.
Figure 4B:
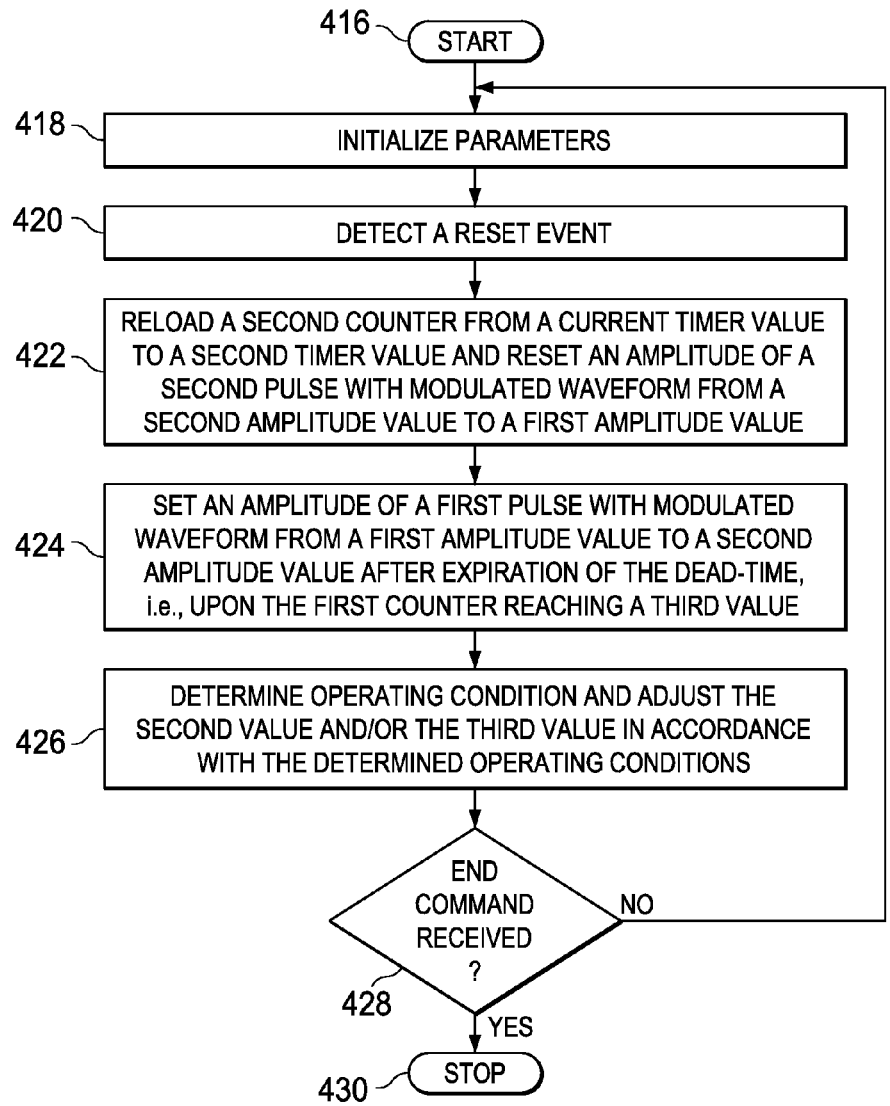
FIG. 4B depicts a flow chart diagram controlling timing at second part of the PWM period using timer counters.

FIG. 4 depicts a flow chart diagram 400 for a control of timing between pulse width modulated waveforms. In particular, FIG. 4A depicts a flow chart diagram controlling the timing at a first part of a PWM period, e.g., the first dead-time of FIG. 3, and FIG. 4B depicts a flow chart diagram controlling the timing at a second part of a PWM period, i.e., the second dead-time of FIG. 3. It is understood that FIG. 4 was divided into two separate flow charts for clarity of explanation, because both the determination of duration and triggering of each of the dead-times is different. However, a person skilled in the art recognizes that the two dead-times are part of a single PWM period as disclosed in FIG. 3 and associated text.

Persons skilled in the art will understand that the term "flowchart" comprises a process carried out both by software and hardware. A discussed supra, the software entity configures the behavior, i.e., which action (set, reset, counter reload) are to be carried out at certain events (counter reaching a set value, occurrence of an external event), and the like. The software entity may be implemented directly in a hardware as depicted and described in relation to the conceptual block diagram of a digitally controlled PCMC based power converter system, in a software module executed by a processor, e.g., the digital controller 117, or in a combination of the two. Other actions, i.e., the setting and/or resetting of the PWM outputs and counter reload are achieved by the hardware.

Referring to FIG. 4A the flow chart starts in step 402 and continues in step 404.

In step 404, parameters for controlling the dead-time are initialized. Such parameters may comprise, e.g., determination and setting of a first value for a second counter. The flow chart continues in step 406.

In step 406, a first counter and the second counter are set to respective initial values and an amplitude of a second pulse with modulated waveform is reset from a second value to a first value. The time at which the action in step 406 is taken is either the beginning of the first PWM period or the end of a previous PWM period marked by the first counter reaching the pulse width modulated period value, which causes first counter and the second counter to be (re)set to the counters' initial values. The flow chart continues in step 408.

In step 408, an amplitude of a first pulse width modulated waveform is set from a first value to a second value after expiration of the dead-time, i.e., upon the first counter reaching the first value. The flow chart continues in optional step 410.

In step 410, operating conditions of the PCMC based power converter system are determined and the first value is adjusted in accordance with the determined operating conditions. The flow chart continues in step 412.

In step 412, it is checked whether a command to stop the operation has been received. Such a command may comprise, e.g., a power disconnect. It is understood that the end command may be issued at any time; consequently, the arrangement of block is not to be interpreted as meaning that the check is performed only following the step 410. If no such command has been received, the flow chart continues in step 404, otherwise, the flow chart continues in step 414.

In step 414, the flow chart ends.

Referring to FIG. 4B the flow chart starts in step 416 and continues in step 418.

In step 418, parameters for controlling the dead-time are initialized. Such parameters may comprise, e.g., determination and setting of a second value and determination and setting of a third value with respect to the second value. Thus, the third value is greater than second value for the case the timer counter is configured to count up; otherwise, the third value may be smaller than second value. The flow chart continues in step 420.

In step 420, a reset event is detected. The flow chart continues in step 422.

In step 422, upon detecting the reset event a second timer counter is reloaded from a current value to a second value and an amplitude of a first pulse width modulated waveform is reset from a second value to a first value. The flow chart continues in step 424.

In step 424, an amplitude of a second pulse width modulated waveform is set from a first value to a second value after expiration of the dead-time, i.e., upon the second timer counter reaching the third value. The flow chart continues in optional step 426.

In step 426, operating conditions are determined and the second value and/or the third value are/is adjusted in accordance with the determined operating conditions. The flow chart continues in step 428.

In step 428, it is checked whether a command to stop the operation has been received. Such a command may comprise, e.g., a power disconnect. It is understood that the end command may be issued at any time; consequently, the arrangement of block is not to be interpreted as meaning that the check is performed only following the step 426. If no such command has been received, the flow chart continues in step 418, otherwise, the flow chart continues in step 430.

In step 430, the flow chart ends.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various aspects of this disclosure are provided to enable one of ordinary skill in the art to practice the present invention. Modifications to various aspects of a presented throughout this disclosure will be readily apparent to those skilled in the art, and the concepts disclosed herein may be extended to other applications. Thus, the claims are not intended to be limited to the various aspects of the wave shaping circuitry presented throughout this disclosure, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for a programmable timing in digital integrated circuits implementing peak current mode controlled power converters comprising:
   setting a second timer value;
   setting a third timer value with respect to the second timer value;
   detecting a reset event;
   reloading a second counter from a current timer value to the second timer value upon detecting the reset event;
   resetting a second pulse width modulated waveform amplitude from a second amplitude value to a first amplitude value upon detecting the reset event; and
   setting a first pulse width modulated waveform from a first amplitude value to a second value upon the second counter reaching a third value.

2. The method as claimed in claim 1 wherein the setting a second timer value comprises:
   setting the second timer value greater than a pulse width modulated time period value.

3. The method as claimed in claim 1 wherein the setting a second timer value comprises:
   determining operating conditions; and
   adjusting the second timer value in accordance with the determined operating conditions.

4. The method as claimed in claim 1 wherein the setting a third timer value with respect to the second timer value comprises:
   setting the third value to a constant.

5. The method as claimed in claim 1 wherein setting a third timer value with respect to the second timer value comprises:
   determining operating conditions; and
   adjusting the third value in accordance with the determined operating conditions.

6. The method as claimed in claim 1 wherein the detecting a reset event comprises:
   comparing a feedback current with a peak current reference signal; and
   detecting a reset event upon the feedback current being equal to the peak current reference signal.

7. The method as claimed in claim 1 further comprising:
   setting a first timer value;
   setting at a first time
      a first counter and the second counter to respective initial values, and
      the second pulse width modulated waveform amplitude from the second amplitude value to the first amplitude value; and
   setting the first pulse width modulated waveform amplitude from the first amplitude value to the second amplitude value upon the first counter reaching the first value.

8. The method as claimed in claim 7 wherein the first time comprises:
   the time when the second counter reaches the pulse width modulated period value.

9. The method as claimed in claim 7 wherein the setting a first timer value comprises:
  setting the first timer value to a constant.

10. The method as claimed in claim 7 wherein the setting a first value comprises:
  determining operating conditions; and
  adjusting the first timer value in accordance with the determined operating condition.

\* \* \* \* \*